Dec. 23, 1969     S. RUBEN     3,485,672
ELECTRIC CURRENT PRODUCING CELL
Filed Sept. 19, 1967
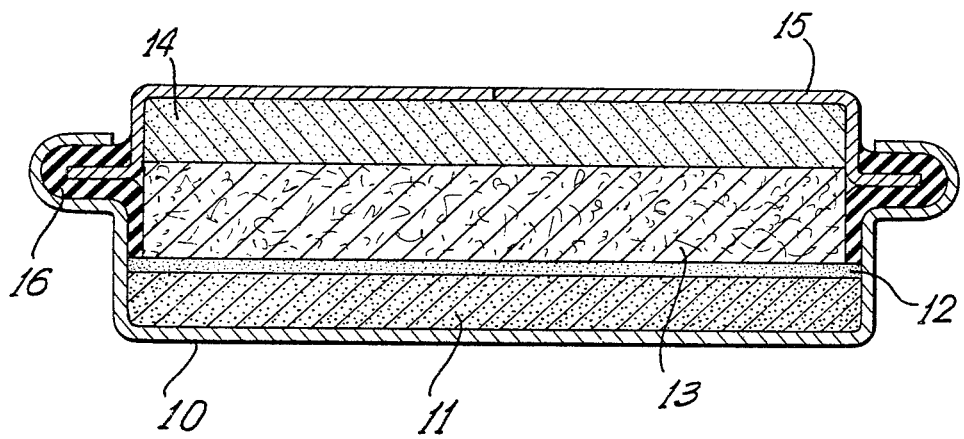
INVENTOR.
SAMUEL RUBEN
BY *Nicholas Jaung*
ATTORNEY

United States Patent Office 3,485,672
Patented Dec. 23, 1969

3,485,672
ELECTRIC CURRENT PRODUCING CELL
Samuel Ruben, 52 Seacord Road,
New Rochelle, N.Y. 10804
Filed Sept. 19, 1967, Ser. No. 672,416
Int. Cl. H01m *3/02, 15/06, 43/04*
U.S. Cl. 136—24
8 Claims

ABSTRACT OF THE DISCLOSURE

The invention is an electric current producing cell having an alkaline electrolyte, two electrodes, and a metal barrier between the electrodes comprising a thin microperforated iron chromium alloy sheet or disc. The barrier is ionically permeable but blocks migration of solid particles. It is plated to present a unipotential surface.

---

This invention relates to primary and secondary electric current producing cells having alkaline electrolytes. In respect to primary cells, it relates particularly to cells employing one or more actively oxidizing depolarizer compounds such as silver oxide, mercuric oxide or cupric oxide, examples of which are disclosed in my U.S. Letters Patents 2,422,045, 2,542,575, 2,542,710, etc. The invention is also applicable to secondary alkaline cells such as nickel cadmium, nickel iron, mercury silver as in my U.S Letters Patents 2,554,504 and 2,571,616, silver zinc, silver cadmium, mercuric oxide-nickel hydroxide-zinc as in my co-pending patent application Ser. No. 229,429, now Patent 3,275,931, etc. The invention is particularly useful in small sealed silver oxide alkaline cells.

In the present manufacture of silver oxide zinc alkaline primary cells, the spacer or barrier which separates the depolarizer from the cellulose absorbent is, in common practice, a type of cellophane commercially known as "Visking." Several layers are used and these are progressively oxidized by contact with the depolarizer. Mercuric oxide alkaline cells of the flat type as presently manufactured, generally comprise an anode of amalgamated zinc, either in pressed powder form or in the form of corrugated foil, a cathode depolarizer consisting of a mixture of mercuric oxide powder and a small amount of micronized graphite compressed into a solid disc and usually consolidated with a steel container, and a separator between the two electrodes comprising a highly absorbent cellulose base material such as "Webril" or "Dexter" paper, usually in combination with a less absorbent organic barrier such as parchment paper. A gelled electrolyte, such as the carboxy methyl cellulose type as described in my U.S. Letters Patent 2,542,710 may be substituted for the "Webril" or "Dexter" paper.

My U.S. Letters Patent 2,422,045, describes other types of barriers which may be used, such as polystyrene fibre, nylon fibre, discs of pressed powder of materials such as polystyrene, vinyl resins, vinylidene resins, polyvinyl alcohol, dialysis grade parchment paper, regenerated sheet cellulose and porous spacers or barriers of inorganic materials, such as pressed discs of magnesium silicate, magnesium hydroxide powder, ceramic or glass powder or purified sheet asbestos. Layers of microporous polyvinyl chloride, non-woven "Dynel" or "Polypor" have also been used. In the present invention a microperforated thin disc of iron chromium alloy is utilized in place of the non-metallic barrier of the prior art.

One of the principal, if not the most important factor limiting the useful life of silver oxide primary and secondary alkaline cells has been the destructive effect of the highly oxidizing depolarizers such as silver oxide upon the cellulose or other organic spacer material with which it is in contact. These destructive effects are eliminated by the use, in the present invention, of a metal barrier comprising a thin sheet or disc of an alloy comprising a preponderance of iron and a much smaller amount of chromium, such as stainless steel, having multiple extremely small perforations therethrough. A suitable material is one produced from microperforated stainless steel sheet made according to the process described in my co-pending application Ser. No. 615,288, filed Jan. 11, 1967, now Patent 3,352,769, of which the present application is a continuation in part. In this process, stainless steel, such as type 430 or other types of stainless steel, having a thickness in the order of from .0005" to .005" is electrolytically treated so as to selectively eliminate the iron chromium precipitates in the grain boundaries. In the production of this material, the stainless steel sheet is made the anode in an electrolytic assembly containing a weak hydrochloric acid electrolyte and subjected to a current of 72 amperes per square foot for a 4 minute period. A typical stainless steel sheet thus processed will have approximately 15,000 light transmitting perforations per square inch and will permit ionic passage therethrough but will block the flow of solid particles from the cathode depolarizer. In order to avoid and suppress the effect of local voltaic action occasioned by the chromium component in the stainless steel, the barrier is plated or coated with a metal such as nickel, cobalt or silver. In the construction of the cells, the plated microperforated ionically pereamble metal barrier is placed in intimate contact with the cathode depolarizer and provides a non-oxidizing barrier in contact with the cellulose absorbent materials. While stainless steels usually contain a minimum of approximately 11½% chromium, it is possible for the purposes of this invention, to use an iron chromium alloy in which the proportion of chromium is substantially reduced. It is essential, however, that there be a preponderance of iron.

In the nickel cadmium and nickel iron types of alkaline cells, the metal coated microperforated stainless steel sheet serves as the container in which the cathode materials are housed.

While perforations in stainless steel sheet can be obtained without the application of external electric current by immersion in halogen solutions for a comparatively long period of time at high temperatures such as 60° C., the type of perforations obtained differ from those anodically produced. The appearance of the perforated sheet not anodically produced is more characteristic of a chemical etch and does not have the distinct uniform and separate hole pattern characteristic of anodically produced material. When processed to the perforated stage, there is some reduction of thickness over the entire sheet and a somewhat duller appearance. However, such material although not as desirable or useful as the anodically produced material can, for the purposes of the present invention, be used in some cell types.

In the cell illustrated in the drawing, the steel container 10 houses depolarizer 11 which consists of a pellet formed from silver oxide powder, the pellet being consolidated into the container at an adequate pressure to provide a unitary assembly. Covering the depolarizer is barrier disc 12 composed of microperforated stainless steel having a thickness of .0025" and a thin impervious coating of silver. The absorbent spacer 13, comprising multiple layers of cotton fibre paper such as "Webril" is in contact with barrier 12 and amalgamated pressed zinc powder anode 14 which is housed in tinned steel top 15. The electrolyte of zincated potassium hydroxide, or other alkaline solutions such as the hydroxides of sodium, lithium or ammonium, is substantially immobilized within the absorbent-barrier spacer. Where a cellulose base electrolyte gel, such as potassium hydroxide-carboxy methyl cellulose is employed in place of the electrolyte absorbing spacer, it is similarly in contact with the barrier and the anode. Polyethylene grommet 16 insulates top member 15 from container 10. An airtight closure for the cell is provided by crimping container 10 against the grommet as shown in the drawing. If desirable for continuous venting, a section of the top or bottom may be formed from plated sub-microperforated nickel chromium stainless steel as described above.

The cell is electrochemically balanced in respect to the amount of zinc and available oxygen content of the depolarizer, or a slight excess of depolarizer may be used.

I claim:

1. An electric current producing cell having an electrolyte selected from the group consisting of hydroxides of potassium, sodium, lithium and ammonium, a negative electrode and a positive electrode; a barrier element interposed between the electrodes and consisting of a sheet of metal plated iron chromium alloy containing a preponderance of iron and a small but significant proportion of chromium, said barrier having a multiplicity of microperforations therethrough, said microperforations being large enough to render said barrier ionically permeable but small enough to prevent the migration of solids therethrough.

2. An electric current producing cell having an alkaline electrolyte, an anode and a depolarizing cathode comprising an electrolytically reducible oxygen-yielding compound, an electrolyte absorbent spacer in contact with the anode and a metal barrier interposed between the depolarizer and the absorbent spacer comprising a disc having a base of microperforated iron chromium alloy.

3. The cell described in claim 2 above in which the iron chromium alloy is stainless steel.

4. An electric current producing cell having two electrodes one of which is selected from the group consisting of zinc and cadmium, a second electrode comprising an oxide of one of the metals, silver, mercury, nickel, copper, manganese and lead, an alkaline electrolyte selected from the group of compounds consisting of the hydroxides of potassium, sodium, lithium and ammonium, said electrolyte containing a substantial quantity of zincate, an inert barrier between the electrodes and in contact with the oxide electrode consisting of a sheet of iron chromium alloy having a thickness not greater than .005", a plating of a metal over said barrier to suppress the effect of local voltaic action occasioned by the chromium content in the alloy, said barrier being characterized by a multiplicity of light transmitting microperforations therethrough of a size sufficient to permit ionic transmission through said barrier, but small enough to prevent migration of solids therethrough from said oxide electrode.

5. A sealed electric current producing cell having an alkaline electrolyte, an amalgamated zinc anode, a cathode depolarizer comprising silver oxide, an ionically permeable barrier element between the anode and cathode depolarizer comprising a plated iron chromium alloy disc consisting preponderantly of iron and having a multiplicity of microperforations therethrough.

6. The cell described in claim 5 above characterized in that a cellulosic electrolyte absorbent spacer is interposed between the barrier and the anode and in contact with both.

7. The cell described in claim 5 above characterized in that the barrier element is plated with a metal selected from the group consisting of nickel, cobalt and silver.

8. A rechargeable electric current producing cell comprising electrodes of nickel oxide and cadmium and an ionically permeable separator between said electrodes comprising a thin iron chromium alloy sheet consisting preponderantly of iron and having a multiplicity of microperforations therethrough, and a plating of a metal over said barrier to suppress the effect of local voltaic action occasioned by the chromium content in the alloy.

References Cited

UNITED STATES PATENTS

| | | | |
|---|---|---|---|
| 2,666,802 | 1/1954 | Woodring et al. | 136—111 |
| 2,678,343 | 5/1954 | Daniel | 136—25 |
| 2,740,821 | 4/1956 | Bone | 136—111 |
| 2,788,383 | 4/1957 | Robinson | 136—115 |
| 2,903,497 | 9/1959 | Comdnor | 136—146 |
| 3,170,820 | 2/1965 | Drengler et al. | 136—111 |

WINSTON A. DOUGLAS, Primary Examiner

C. F. LE FEVOUR, Assistant Examiner

U.S. Cl. X.R.

136—28, 111, 146